(12) United States Patent
Fleming et al.

(10) Patent No.: US 7,066,218 B1
(45) Date of Patent: Jun. 27, 2006

(54) INSECT CONTROL SYSTEM AND METHOD

(75) Inventors: John Fleming, Sandia, TX (US);
Eileen Fleming, Sandia, TX (US)

(73) Assignee: TMC Systems, L.P., Sandia, TX (US)

( * ) Notice: Subject to any disclaimer, the term of this patent is extended or adjusted under 35 U.S.C. 154(b) by 90 days.

(21) Appl. No.: 10/696,596

(22) Filed: Oct. 29, 2003

(51) Int. Cl.
*B65B 1/30* (2006.01)
*A01G 25/00* (2006.01)
*A01G 27/00* (2006.01)

(52) U.S. Cl. .................... 141/198; 239/63; 239/64; 239/67; 239/69; 239/70; 239/71; 239/74

(58) Field of Classification Search .............. 239/63, 239/64, 67, 69, 70, 71, 74, 337, 349, 351, 239/208; 141/198
See application file for complete search history.

(56) References Cited

U.S. PATENT DOCUMENTS 3,889,881 A * 6/1975 Cunningham et al. ........ 239/70
3,979,063 A    9/1976 Query
4,306,685 A * 12/1981 Coffee ......................... 239/690
4,446,731 A *  5/1984 Martin ......................... 73/334
4,652,218 A *  3/1987 Tsutsui et al. .............. 417/368

OTHER PUBLICATIONS

"The Mosquito Mist Away" at http://www.townandcountrymosquito.com.

* cited by examiner

*Primary Examiner*—Davis Hwu
(74) *Attorney, Agent, or Firm*—Jackson Walker, LLP (57) ABSTRACT

The present invention provides an automated insect control system. The system utilizes a container tank, a canned pump, distribution system, and a programmable digital timer to allow a user to control the times per day and the duration in which to apply insecticide to an area. A remote control is provided which permits a user to commence and terminate spraying of insecticide as the need arises without resorting to reprogramming of the spraying schedule.

10 Claims, 8 Drawing Sheets

INSECT CONTROL SYSTEM AND METHOD

BACKGROUND OF THE INVENTION

1. Field of the Invention

Applicants' invention relates generally to the field of insect control. More specifically, Applicants' invention relates to automated insect control systems.

2. Background Information

The invention relates to a system for the control of insects. In particular, the invention is a spraying system comprising a container for insecticide, a pump, a programmable digital timer, and a distribution system to allow the insecticide to be distributed over a wide area.

Controlling the insect population over a wide area is important to the quiet enjoyment of a social gathering or for the protection of goods and property. However, because the effect of an insecticide diminishes over time and insect population and activity varies over time, the application of proper amounts of insecticide is difficult and cumbersome.

Thus, there exists a need for an insect control system which allows a user to vary the application of insecticide in terms of time and volume. Further, such a system should allow for the instant application of a selected volume of insecticide for a selected period of time to respond to immediate and changing conditions.

The general field of insect sprayers is rich with disclosure and invention. Mainly because the public has been battling insects since the dawn of time.

U.S. Pat. No. 5,931,207 to Gianino discloses a portable home and garden sprayer with a power unit. A hand-held compressed air power unit is used for spraying liquids from a tank. Because of the construction of the device, user intervention is required to make the device function.

U.S. Pat. No. 4,202,498 to Lestradet discloses a mobile insecticide sprayer. The apparatus allows for the spraying of insecticide while mounted on agricultural machines which are equipped to regulate the flow of the insecticide. Because of the construction of the device, the device is not an automated system and user intervention is required to make the device function.

U.S. Pat. No. 4,945,673 to Lavelle discloses a centralized extermination system. The system comprises chambers that are permanently placed at various positions in the walls of a building. Each chamber comprises a duct having an open proximal end and holes in its sides. When insecticide is sprayed through the nozzle, the nozzle evenly disperses the insecticide through the holes in the chamber to reach the cavity of the wall. This system lacks a storage device to hold insecticide and requires user intervention to make the device function.

U.S. Pat. No. 3,979,063 to Query discloses an insecticide spray system that comprises a main conduit with branch conduits. Each conduit has a normally closed nozzle with a solenoid actuated valve. The solenoids are all connected through a timer to a power source. An insecticide-gas propellant mixture is disclosed which sprays insecticide when the solenoids are opened by the timer.

While these units may be suitable for the particular purposes employed, or for general use, they would not be as suitable for the purposes of the present invention as disclosed hereafter. In particular, they lack automation, programmability, a manual override with remote control, and other features. Each of the above referenced disclosures requires manual intervention to dispense insecticide or require the use of high pressure gas systems.

SUMMARY OF THE INVENTION

In accordance with the present invention, an Insect Control System is provided which substantially eliminates or reduces the disadvantages and problems associated with previous systems and methods.

In accordance with one aspect of the present invention, a system is provided comprising a container for containing a liquid insecticide, a distribution system for delivering the liquid insecticide from the container to a plurality of remote locations, a pump in operable engagement with the distribution system for pumping the liquid insecticide from the container to the remote locations, and a programmable digital timer to control the pump. The liquid insecticide can be a safe, natural insecticide such as Pyrethrum, a Chrysanthemum extract.

Applicants enhance the field of insect sprayer systems with their novel combination of pre-programmed, unattended operation and distribution of insecticide, and the ability to manually dispense an selected amount of insecticide at any time and low-cost, reliable operation.

Applicants achieve greater control and accuracy of insecticide distribution through the use of a programmable digital timer which permits unattended spraying of insecticide. The efficiency of Applicants' time-targeted application decreases the amount of insecticide that needs to be applied to an area at any selected time to control the area's insect population.

Further, Applicants achieve more economical insecticide distribution through the use of a canned pump and a remote control on/off switch. A canned pump is an integrated pump and motor sealed within a case. A representative model of a canned pump is the Procon Model 7400. The remote control on/off switch permits a user to apply a selected amount of insecticide at a selected time. This capability reduces the temptation of a user to over-apply insecticide to ensure the eradication of insects in a given area.

BRIEF DESCRIPTION OF THE DRAWINGS

For a more complete understanding of the present invention and the advantages thereof, reference is now made to the following description taken in conjunction with the accompanying drawings in which like reference numbers indicate like features, and where in.

DETAILED DESCRIPTION OF THE PREFERRED EMBODIMENT

Figure 1:
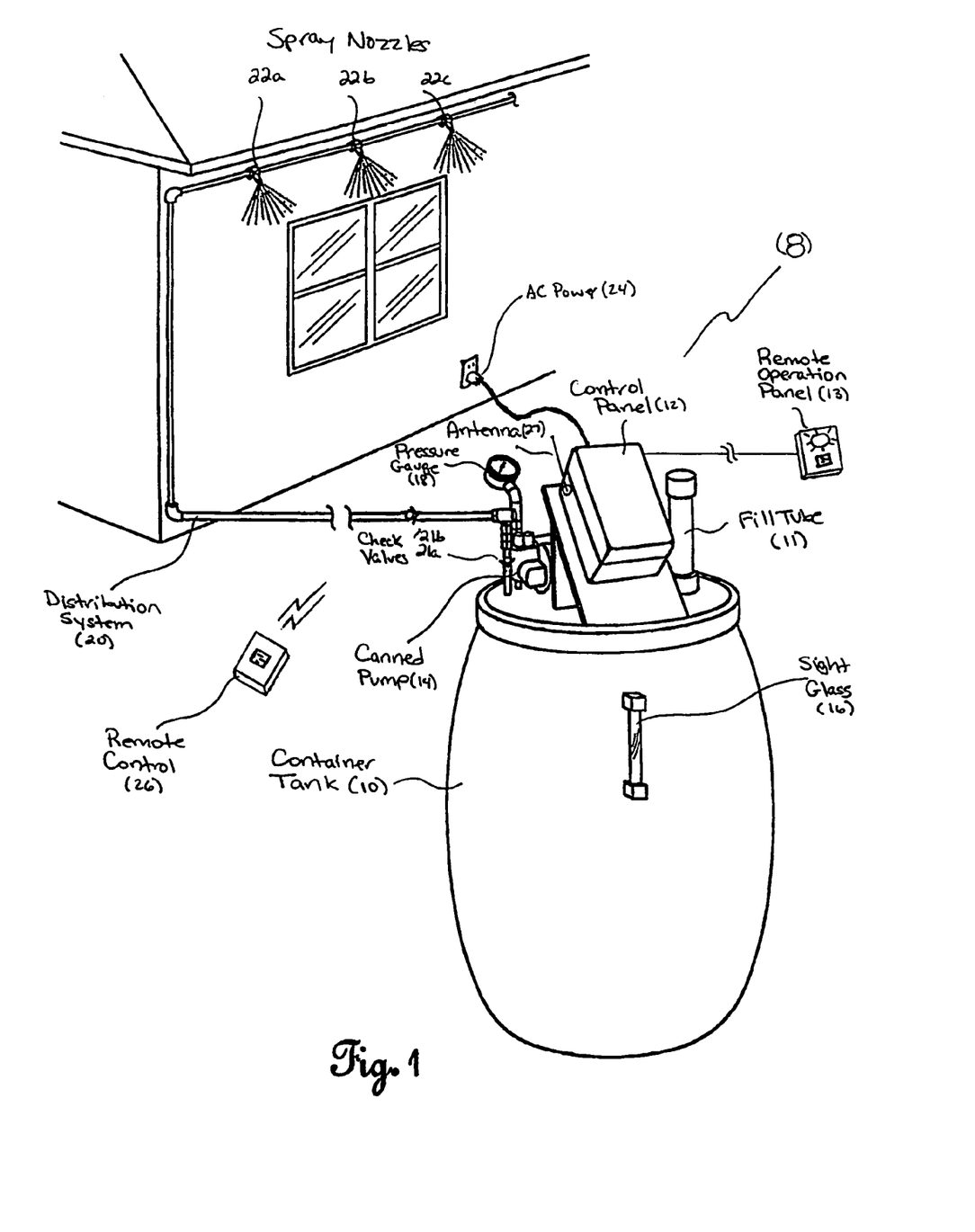
FIG. 1 illustrates a perspective view of one embodiment of the insect spray system.

Referring to the figures, FIG. 1 illustrates a first embodiment of Applicants' insect control sprayer system (8). The figure shows the container tank (10), the control panel (12), and the canned pump (14). Insecticide may be poured into the container tank (10) via the fill tube (11). The level of insecticide within the container tank (10) may be visually determined by inspection of the sight glass (16). The control panel (12) may be programmed for a minimum of 0 to a maximum of 288 spraying intervals in any given 24 hour period. Each spray interval may have a duration ranging from 1 second to 99 seconds. The pressure gauge (18) displays the pressure of the insecticide being pumped by the canned pump (14) to the distribution system (20). Although FIG. 1 shows the distribution system (20) as being attached to the exterior of a home, it should be noted that the distribution system may be mounted within the walls during the construction of a building with only the nozzles (22) being visible. The canned pump (14) pumps insecticide through the distribution system (20) where the insecticide is expelled in appropriate locations by spray nozzles (22). Check valves (21) ensure that insecticide does not flow back into the canned pump (14) or the container tank (10). The entire system draws power from an AC power source (14). However, a battery backup for the control panel (12) is provided (Element 38 on FIG. 2). A user may remotely commence and terminate the spraying of insecticide via a wireless remote control (26). A hardwired remote operation panel (13) is also provided to remotely commence and terminate the spraying of insecticide.

The wireless remote control (26) and the hardwired remote operation panel (13) may operate in one of two modes. In the first mode, depressing a button on either remote (13 or 26) will cause the canned pump (14) to be energized and commence the spray of insecticide. The canned pump (14) will remain energized only so long as the button on the remote (13 or 26) is depressed. Once the button is released, the canned pump (14) is de-energized and the spray of insecticide terminates. In the second mode, depressing a button on either remote (13 or 26) will cause the canned pump (14) to be energized and commence the spray of insecticide. In this mode, releasing the button does not de-energize the pump. Rather, the button on the remote (13 or 26) must be depressed a second time to terminate the spraying of insecticide. In either mode, the signal generated by either remote (13 or 26) is received by the control panel via the control panel antenna (27) in the case of the wireless remote control (26) or directly in the case of the hardwired remote operation panel (13). To commence the spraying of insecticide, whether in response to a signal from the remote control (13 or 26) or due to user scheduling, the control panel (12) closes a normally open circuit to energize the canned pump (14).

Figure 2:
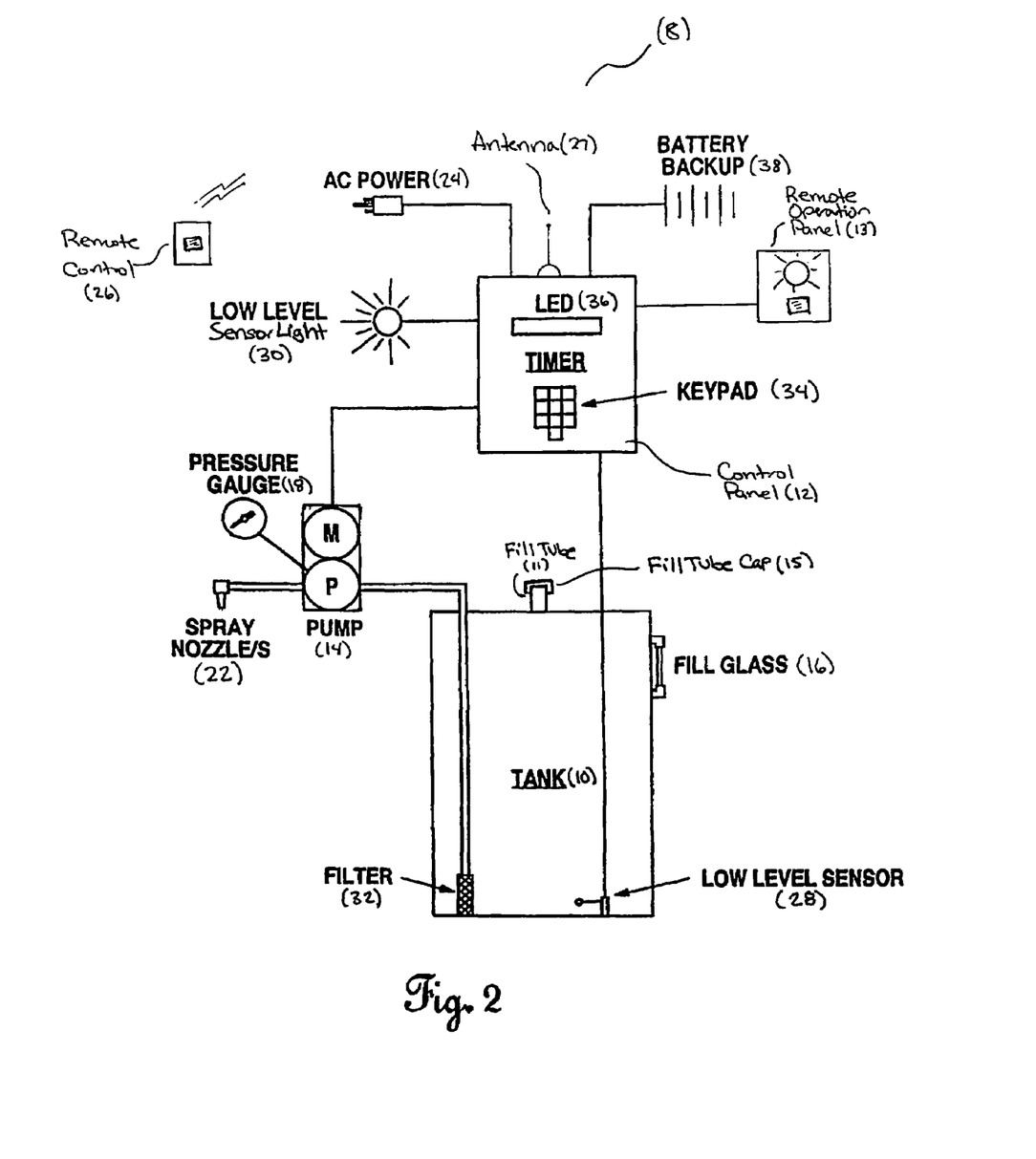
FIG. 2 illustrates an equipment diagram of one embodiment of the insect spray system.

FIG. 2 is an equipment diagram of Applicants' insect control sprayer system (8). Backup power is supplied to the control panel via a battery backup (38) to preserve user settings in the event that AC power (24) fails. A low level sensor (28) within container tank (10) detects when the insecticide reaches a first low level. Upon reaching the first low level, the low level sensor (28) sends a signal to the control panel (12) which causes the low level sensor light (30) to illuminate. When the insecticide level reaches a second low level, the low level sensor (28) sends a signal to the control panel (12) which then prevents further operation of the canned pump (14) until the low level sensor (28) terminates its signal. A filter (32) prevents contaminants from entering the distribution system (20). Referring to the control panel (12), a user accesses the features of the control panel (12) via the control panel keypad (34) and information is displayed to the user on the control panel display (36).

Figure 3:
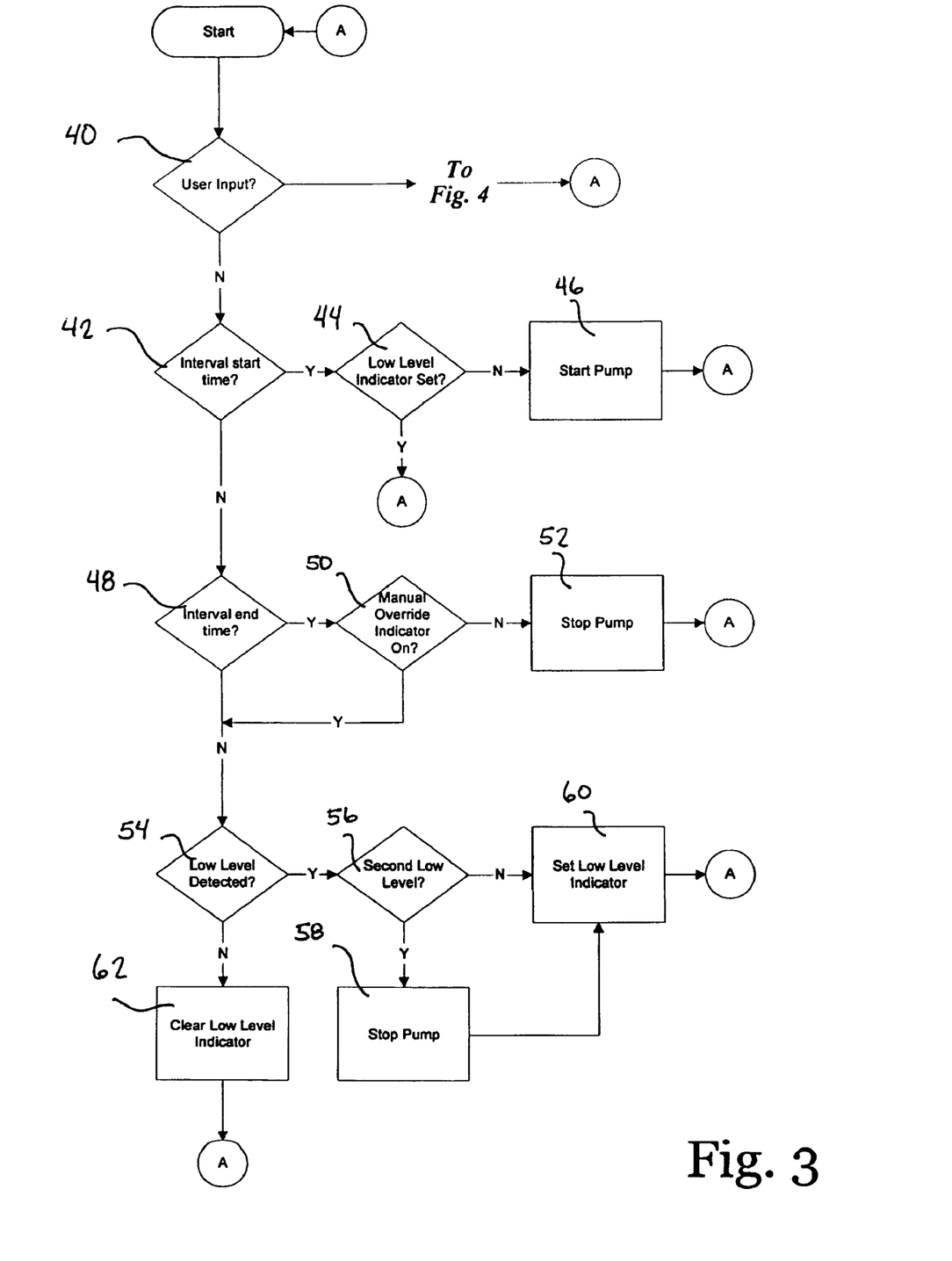
FIGS. 3 and 4 are process flow diagrams illustrating the control process of one embodiment of the present invention.
Figure 4:
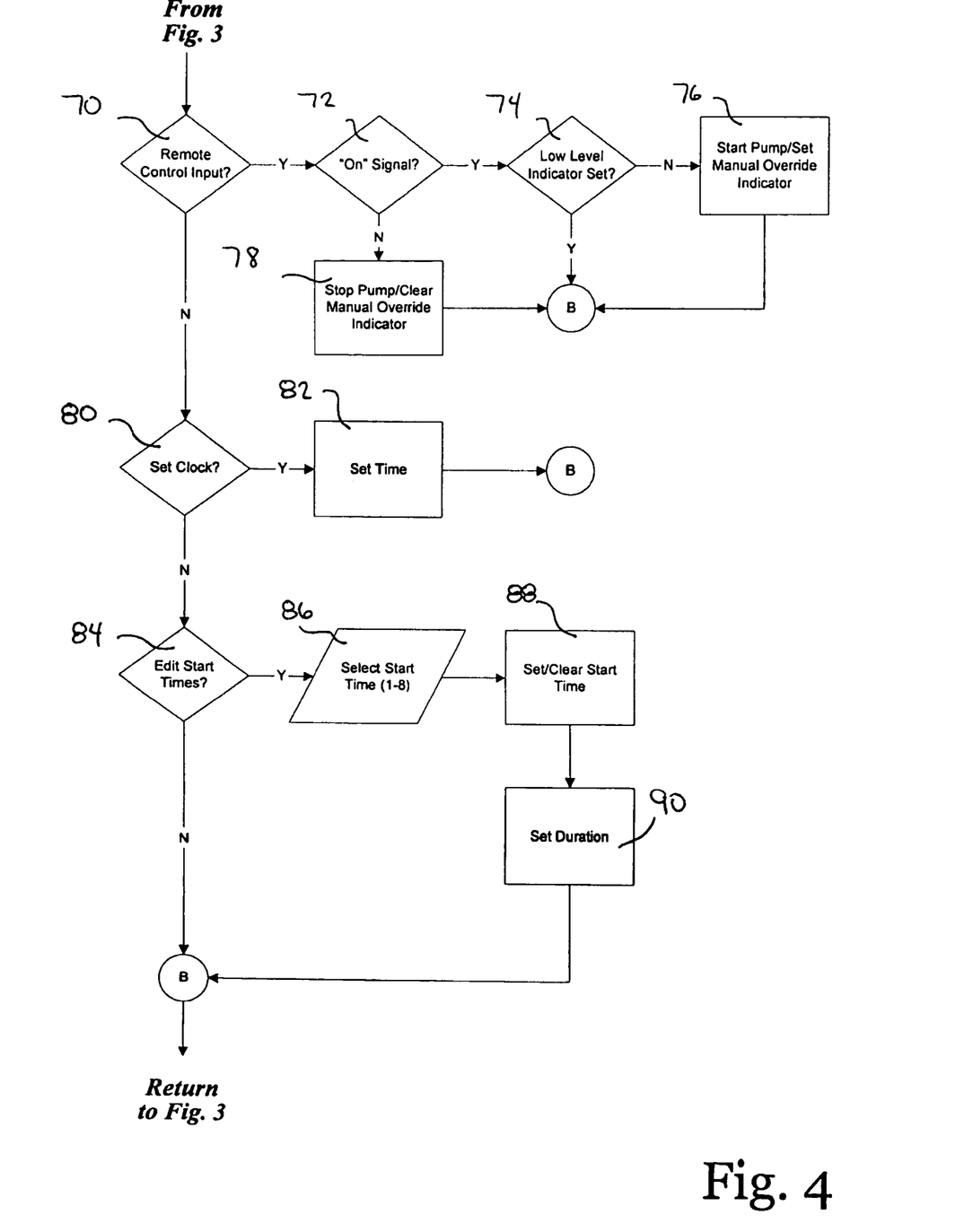

Referring to FIGS. 3 and 4, a computer system controls Applicants' insect control spray system. If the computer system does not detect user input, Box 40, it compares the current time to the stored start intervals to determine whether spraying of insecticide should commence, Box 42.

If an interval start time has been reached, Box 42, the system checks for a signal from the low level sensor (28). If the low level sensor (28) is not set, the canned pump (14) is energized causing insecticide to flow through the distribution system (20) and spray from the nozzles (22). If the low level sensor (28) is set, the system does nothing.

If an interval end time has been reached, Box 48, the system determines whether the user has manually overridden the system to cause the system to spray insecticide. If the user has manually overridden the system, Box 50, the system is allowed to continue spraying. Otherwise, the pump is de-energized, Box 52.

If the system detects that the low level sensor (28) is set, Box 54, the system determines whether the insecticide level has reached the first low level or the second low level, Box 56. If the insecticide has reached the first low level, the system sets the low level indicator, Box 60, and causes the low level sensor light (30) to illuminate. If the insecticide has reached the second low level, the system first stops all pumping activity, Box 58, and then sets the low level indicator, Box 60, and causes the low level sensor light (30) to illuminate. If the system detects that the low level sensor (28) is not set, it clears the low level indicator is and darkens the low level sensor light.

Referring back to Box 40, if the system detects user input, the system determines whether the input was from the remote control (26) or from the control panel keypad (34).

If the input is from the remote control, Box 70, the system determines whether the user desires to commence or terminate spraying insecticide, Box 72. If the user desires to terminate spraying, the system stops the canned pump (14) and clears the manual override indicator, Box 78. If the user desires to commence spraying, the system checks whether the low level sensor (28) is set, Box 74. If the low level sensor (28) is not set, the system energizes the canned pump (14) and sets the manual override indicator, Box 76.

If the user input is from the control panel keypad (34) and the user desires to set the current time, Box 80, the system prompts the user for the current time and accepts the time from the user, Box 82.

If the user input is from the control panel keypad (34) and the user desires to set or clear spray intervals, Box 84, the system prompts the user for the interval to set or clear, Boxes 86 and 88, and prompts the user for the spray duration if the user is setting a spray interval, Box 90.

Figure 5:
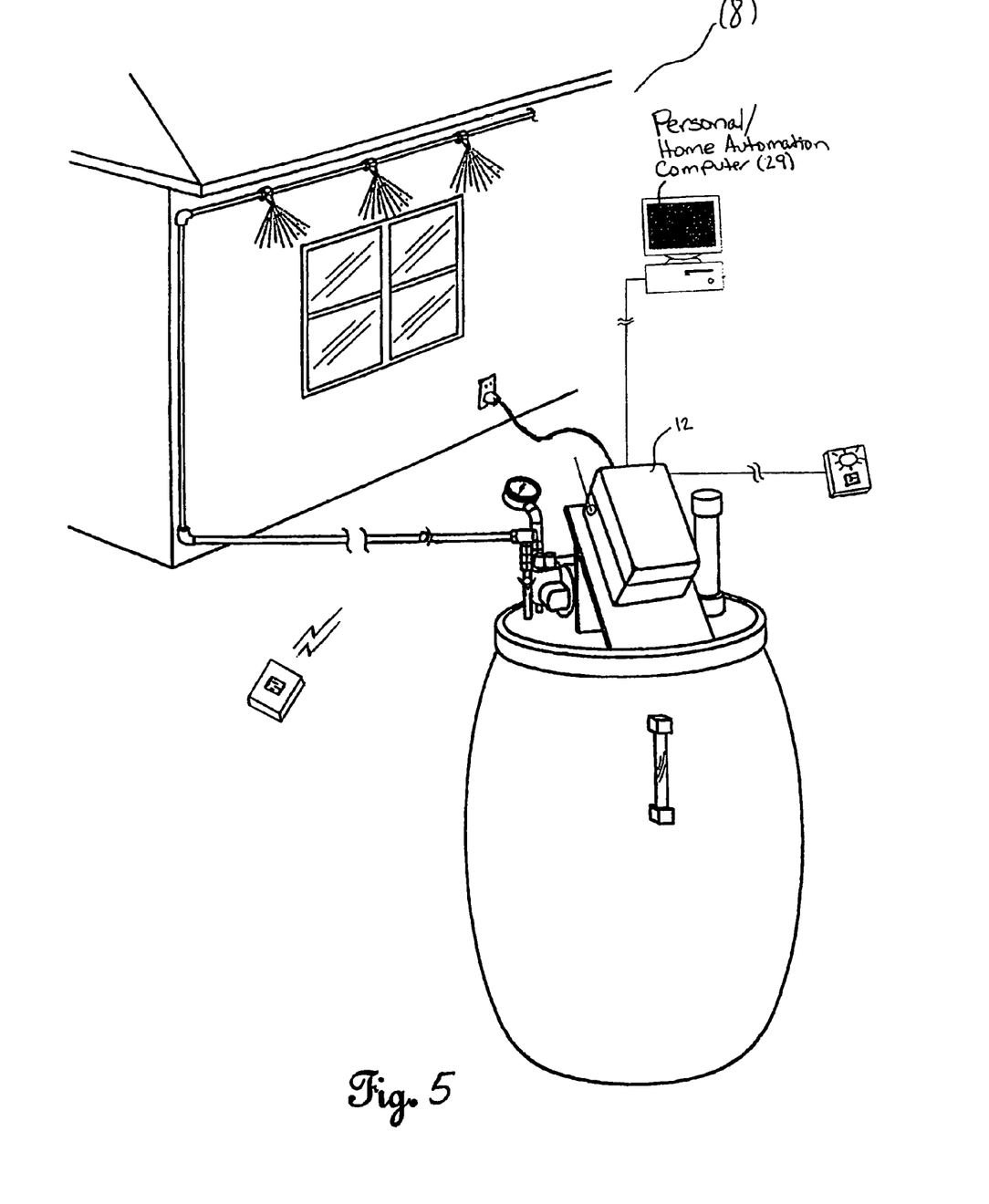
FIG. 5 illustrates a perspective view of an alternative embodiment of the insect spray system wherein a home computer or a home-automation computer is operable to control the insect spray system.

FIG. 5 illustrates an alternate embodiment of Applicants' insect control sprayer system (8). In this embodiment, a programmable computer (29) communicates with the control panel (12) to offer enhanced control over the operation of the insect control sprayer system (8). The programmable computer (29) may be a stand-alone personal computer or may be part of a "smart house" or automated home system. The programmable computer (29) may be programmed to commence and terminate the spraying of insecticide at any time. Additionally, the programmable computer (29) may report to the user the current insecticide level and whether a low level of insecticide condition exists.

Figure 6:
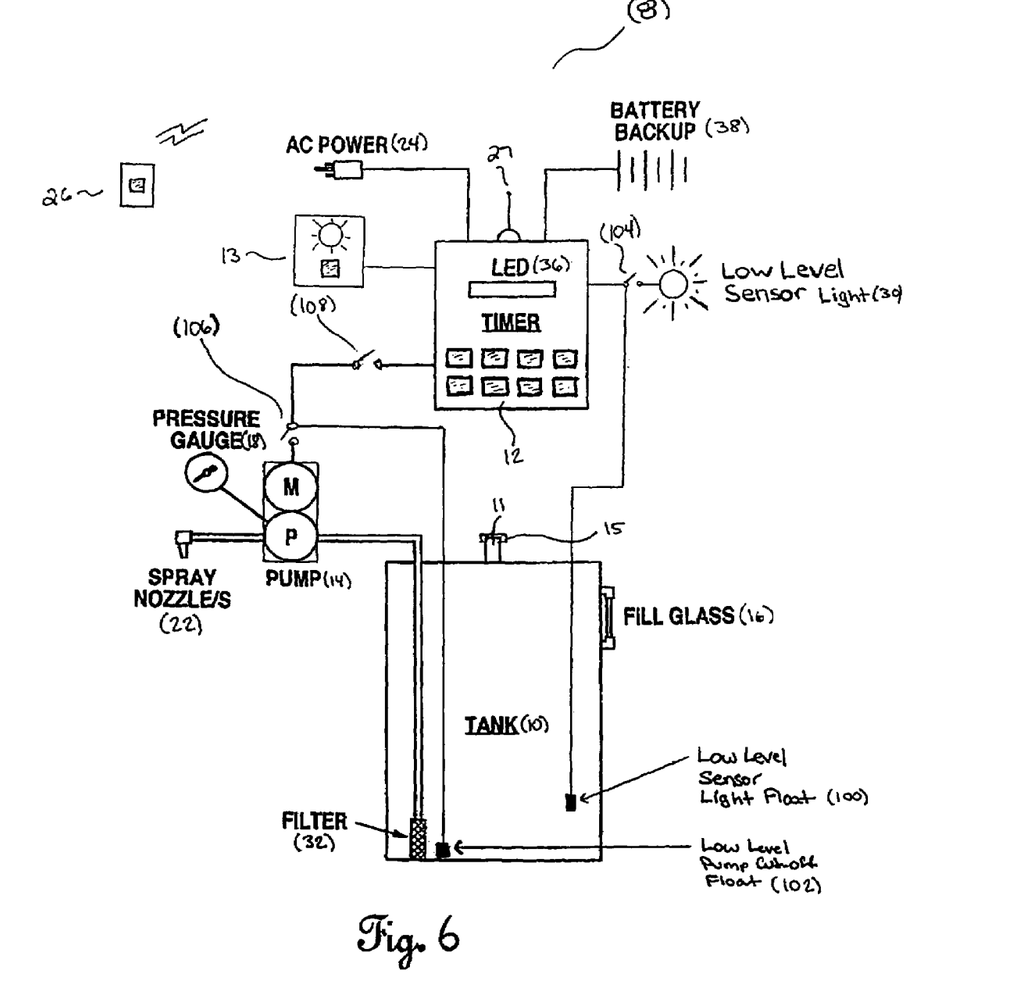
FIG. 6 illustrates an equipment diagram of an alternative embodiment of the insect spray system.

FIG. 6 is an equipment diagram of an alternate embodiment of Applicants' insect control sprayer system (8). In this embodiment, a pair of floats (100 and 102) are substituted for the low level sensor (28) of the first embodiment. The low level sensor light float (100) is connected to a normally open low level sensor light circuit (104). The low level pump cutoff float (100) is connected to a normally closed pump cutoff circuit (104). When the insecticide level within the container tank (10) reaches a first low level, the low level sensor light float (100) closes the low level sensor light circuit (104) causing the low level sensor light (30) to illuminate. If the insecticide within the container tank (10) is further depleted and reaches a second low level, the low level pump cutoff float (100) opens the pump cutoff circuit (104) preventing power from being provided to the canned pump (14) until insecticide is added to the container tank (10). A manual override circuit (108) is also provided. A user may open the normally closed manual override circuit (108) to prevent operation of the canned pump (14) notwithstanding the programming schedule of the control panel (12).

Figure 7:
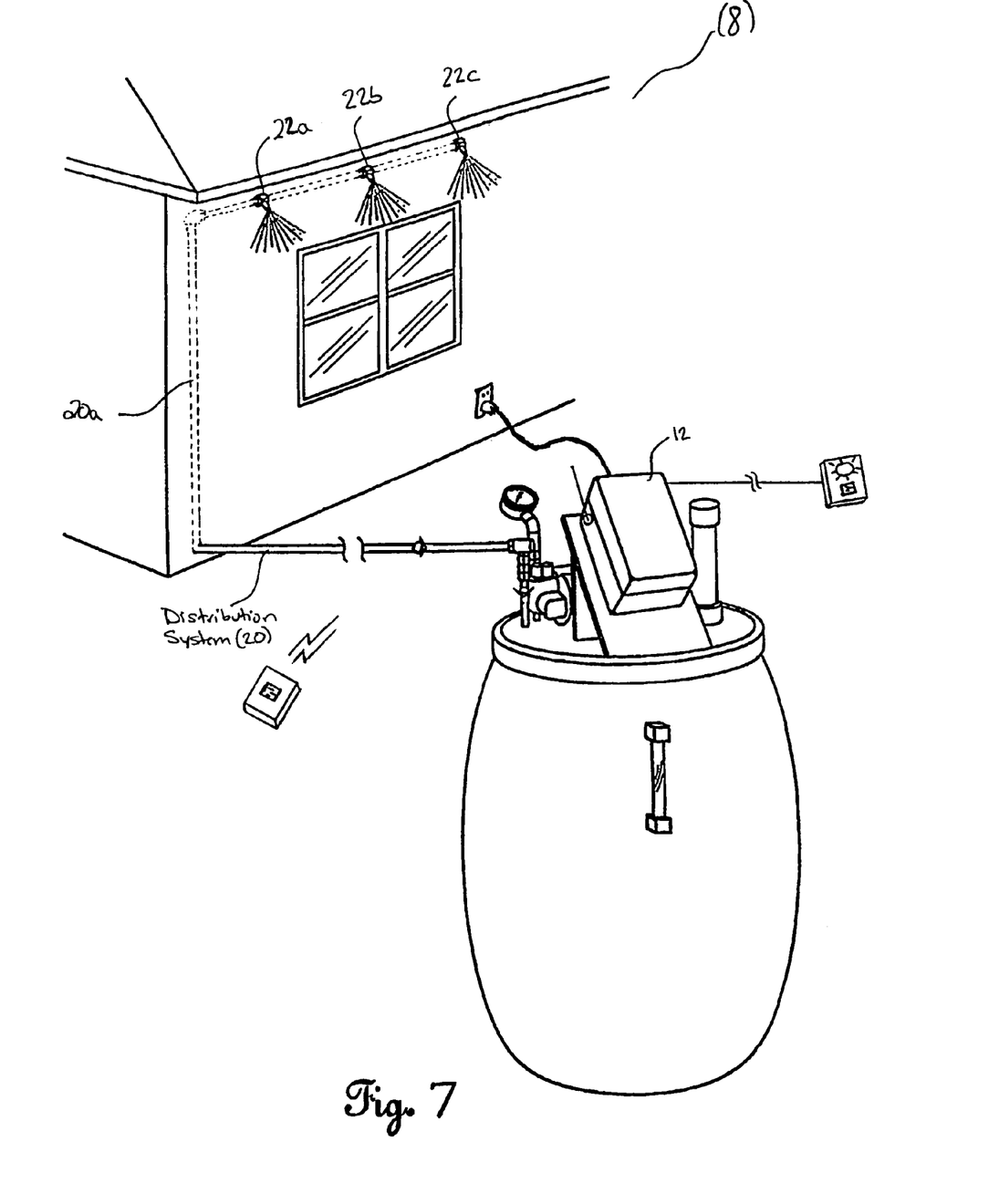
FIG. 7 illustrates a perspective view of an alternative embodiment of the insect spray system.

FIG. 7 illustrates an alternative embodiment of Applicants' insect control sprayer system (8). In this embodiment, the distribution system (20) is partially embedded (20a) within the structure of a building. This embodiment is more aesthetically pleasing to the user of the system as the only visible indicia of the system are the spray nozzles (22).

Figure 8:
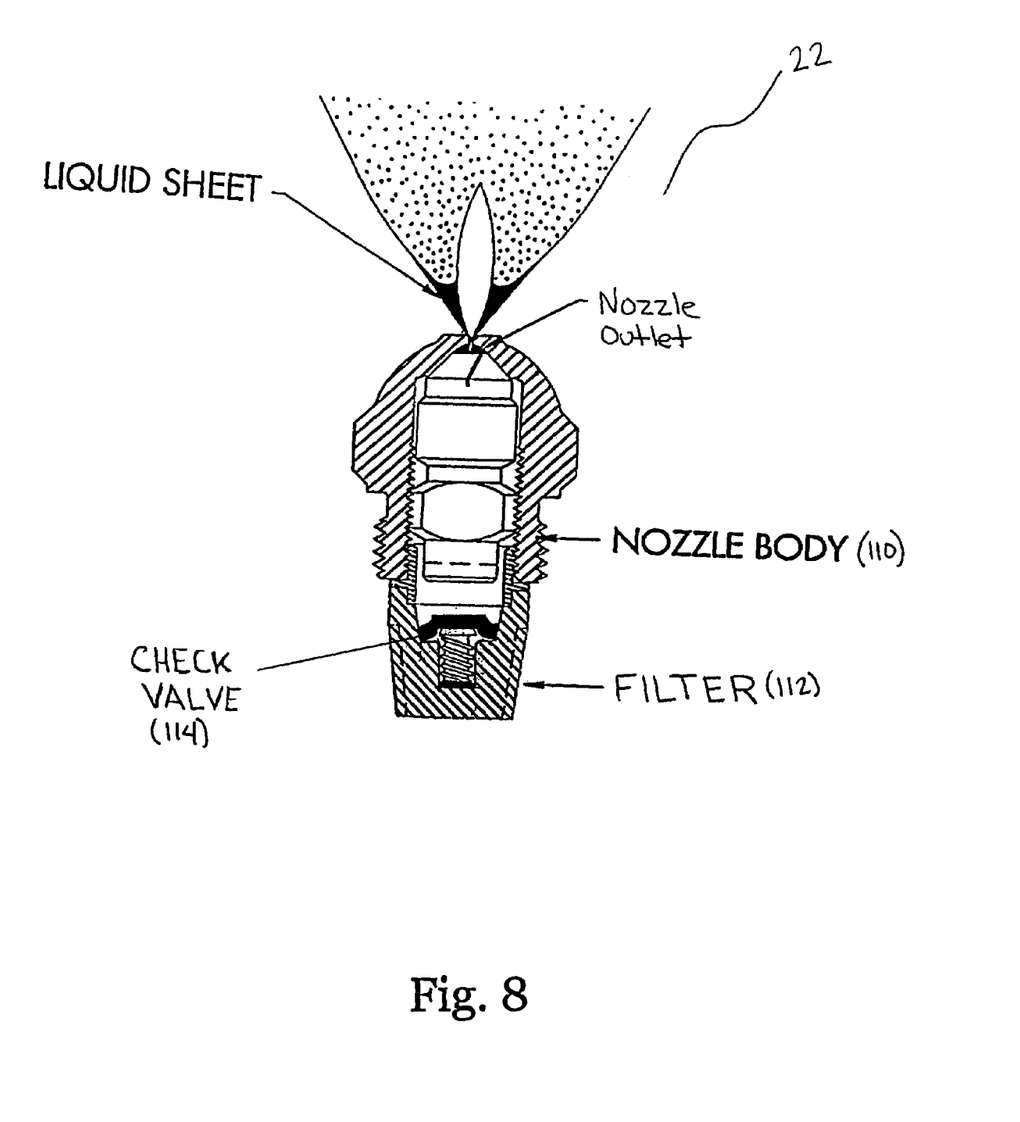
FIG. 8 illustrates section view of a spray nozzle.

FIG. 8 illustrates section view of a spray nozzle. The nozzles (22) are atomizing nozzles comprised of a stainless steel housing (110); a non-corrosive, bronze fine-mesh filter (112); and a check valve (114) to reduce or prevent dripping at the termination of a spray interval. A representative manufacturer of the nozzles is Hago.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A mosquito and insect control system comprising:
a container for containing a liquid insecticide, a fill tube connected thereto;
a sight class engaged with the container for determining the insecticide level therein;
a first float and a second float within the container;
the first float operable to detect a first low level of insecticide condition within the container tank and visually indicate said first low level condition;
the second float operable to detect a second low level of insecticide condition within the container tank and to de-energize the pump upon said second low level condition;
a distribution system for delivering liquid insecticide from the container to a plurality of remote locations;
a canned pump in operable engagement with the distribution system for pumping the liquid insecticide from the container to the plurality of remote locations;
a programmable digital timer for controlling the pump operable to energize and de-energize the pump for a pre-selected duration of time at a pre-selected time;
a handheld wireless remote control unit to manually energize and de-energize the canned pump from a remote location;
a hardwired remote control unit to manually energize and de-energize the canned pump from a remote location; and
nozzles at the removed end of the distribution system to direct the spray of insecticide, the nozzles being atomizing nozzles comprised of a stainless steel housing, a non-corrosive, bronze fine-mesh filter, and a check valve to reduce or prevent dripping at the termination of a spray interval; and
a pressure gauge to monitor the pressure of the insecticide within the distribution system.

2. A mosquito and insect control system comprising:
a container for containing a liquid insecticide;
a distribution system for delivering liquid insecticide from the container to a plurality of remote locations;
nozzles at the removed end of the distribution system to direct the spray of insecticide; and
a pump in operable engagement with the distribution system for pumping the liquid insecticide from the container to the plurality of remote locations;
programmable digital timer for controlling the pump operable to energize and de-energize the pump for a pre-selected duration of time at a pre-selected time; and
a remote override unit and wherein the programmable digital timer controller is adapted to energize the pump and to de-energize the pump in response to a signal from the remote override.

3. The mosquito and insect control system of claim 2 wherein the pump remains energized only so long as a continuous signal from the remote override unit is received; the pump being de-energized when the signal terminates.

4. The mosquito and insect control system of claim 1 wherein the pump is energized in response to a first signal from the remote override unit and is de-energized in response to a second signal from the remote override unit.

5. The mosquito and insect control system of claim 1 wherein the programmable digital timer controller is adapted to operate from an alternating current power source.

6. The mosquito and insect control system of claim 1 wherein the programmable digital timer controller includes a backup direct current power source.

7. A mosquito and insect control system comprising
a container for containing a liquid insecticide;
a distribution system for delivering liquid insecticide from the container to a plurality of remote locations;
nozzles at the removed end of the distribution system to direct the spray of insecticide; and
a pump in operable engagement with the distribution system for pumping the liquid insecticide from the container to the plurality of remote locations;
programmable digital timer for controlling the pump operable to energize and de-energize the pump for a pre-selected duration of time at a pre-selected time;
a first float and a second float;
the first float operable to detect a first low level of insecticide condition within the container tank and visually indicate said first low level condition; and
the second float operable to detect a second low level of insecticide condition within the container tank and to de-energize the pump upon said second low level condition.

8. A mosquito and insect control system comprising:
a container for containing a liquid insecticide;
a distribution system for delivering liquid insecticide from the container to a plurality of remote locations;
nozzles at the removed end of the distribution system to direct the spray of insecticide; and
a pump in operable engagement with the distribution system for pumping the liquid insecticide from the container to the plurality of remote locations;
programmable digital timer for controlling the pump operable to energize and de-energize the pump for a pre-selected duration of time at a pre-selected time, said programmable digital timer controller is adapted to visually indicate a low level of insecticide condition within the container; and a low level sensor to signal the programmable digital timer controller at pre-selected levels of insecticide within the container.

9. A mosquito and insect control system comprising:

a container for containing a liquid insecticide;

a distribution system for delivering liquid insecticide from the container to a plurality of remote locations;

nozzles at the removed end of the distribution system to direct the spray of insecticide, wherein the nozzle ends are flexible to permit directional adjustments of the insecticide spray; and a pump in operable engagement with the distribution system for pumping the liquid insecticide from the container to the plurality of remote locations; and programmable digital timer for controlling the pump operable to energize and de-energize the pump for a pre-selected duration of time at a pre-selected time.

10. An automated method of applying insecticide to an area providing a pump, a container adapted to receive a liquid insecticide, a distribution system with a plurality of nozzles to direct the spray of the liquid insecticide, a programmable digital timer, and a remote override transmitter, comprising the steps of:

directing the spray of insecticide with the plurality of nozzles;

defining discrete intervals for insecticide application;

defining the duration of application for each of the defined intervals;

initiating the application of insecticide by energizing the pump at the beginning of each interval;

terminating the application of insecticide by de-energizing the pump at the expiration of the allotted time for the indicated interval; and allowing the transmitting signals from the remote override transmitter to initiate and terminate application of insecticide.

* * * * *